United States Patent
Nagarajan et al.

(10) Patent No.: US 7,372,805 B2
(45) Date of Patent: May 13, 2008

(54) TRAFFIC GROOMING METHODS FOR UNDERSEA TRUNK AND BRANCH ARCHITECTURES

(75) Inventors: Ramesh Nagarajan, Somerset, NJ (US); Muhammad A Qureshi, Metuchen, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1410 days.

(21) Appl. No.: 09/849,187

(22) Filed: May 4, 2001

(65) Prior Publication Data

US 2001/0055321 A1 Dec. 27, 2001

Related U.S. Application Data

(60) Provisional application No. 60/202,580, filed on May 9, 2000.

(51) Int. Cl.
*G01R 31/08* (2006.01)
(52) U.S. Cl. ........................... 370/222; 370/254
(58) Field of Classification Search ........ 370/535–545, 370/400–401, 465, 468, 907, 216, 358, 360, 370/406; 307/43; 398/25
See application file for complete search history.

(56) References Cited

U.S. PATENT DOCUMENTS

| | | | | |
|---|---|---|---|---|
| 4,899,337 A | * | 2/1990 | Hirai | 370/428 |
| 5,105,420 A | * | 4/1992 | Ardon et al. | 370/216 |
| 5,185,736 A | * | 2/1993 | Tyrrell et al. | 370/358 |
| 5,214,312 A | * | 5/1993 | Inoue | 307/43 |
| 5,253,248 A | * | 10/1993 | Dravida et al. | 370/228 |
| 5,754,545 A | * | 5/1998 | Shinbashi et al. | 370/360 |
| 6,075,630 A | * | 6/2000 | Nishio | 398/25 |
| 6,269,081 B1 | * | 7/2001 | Chow et al. | 370/241 |
| 6,477,142 B1 | * | 11/2002 | Remein | 370/222 |
| 6,542,511 B1 | * | 4/2003 | Livermore et al. | 370/406 |
| 6,724,722 B1 | * | 4/2004 | Wang et al. | 370/229 |

FOREIGN PATENT DOCUMENTS

JP 10-041887 * 2/1998

* cited by examiner

*Primary Examiner*—Robert W. Wilson

(57) ABSTRACT

In a network architecture, selective grooming is performed. In selective grooming, a low traffic node is coupled (a) directly to an other low traffic node via a high capacity trunk, and (b) to a high traffic node via a high capacity trunk such that only a portion of the client signals destined for the other low traffic node are groomed into the high capacity trunk to the high traffic node.

13 Claims, 8 Drawing Sheets

TRAFFIC GROOMING METHODS FOR UNDERSEA TRUNK AND BRANCH ARCHITECTURES

CROSS-REFERENCE TO RELATED APPLICATIONS

This application claims the benefit of U.S. Provisional Application No. 60/202,580, filed May 9, 2000.

FIELD OF THE INVENTION

This invention relates generally to communications and, more particularly, to optical and packet communications systems.

BACKGROUND OF THE INVENTION

In an undersea cable system, trunk and branch architectures provide a cost-effective way of connecting many landing stations to a single cable. Moreover, inherent to trunk and branch architectures are desirable features like security (very important when connecting many sovereign countries together) and high availability. (Security, as used herein, refers to the lack of direct access by a third-party node to the communications traffic between a first party node and second party node.)

An undersea cable system generally spans many countries, which may have diverse bandwidth needs so it is common for an undersea cable system to provide more than one level of bandwidth. For example, client signals may range from E1 (PDH (plesiochronous digital hierarchy)) level of transport (2 Mbps (millions of bits per second)) to synchronous transport module (STM)-16 (2.5 Gbps (Giga bits per second)), while the undersea transport infrastructure for these client signals may utilize higher rate signals such as STM-64 (10 Gbps and up). As such, various traffic grooming methods are used to increase utilization of the high rate undersea transport infrastructure.

SUMMARY OF THE INVENTION

Compared to terrestrial systems, the cost per bandwidth mile is very high in an undersea cable system. Therefore, grooming at many levels is common and desirable. (Grooming refers to the method of rearrangement of lower-speed signals within a higher-speed container signal in order to improve the utilization of the container capacity). Unfortunately, when a network architecture supports grooming, the affects on network security and reliability must be understood. In addition, capacity utilization must be considered. As such, and in accordance with the invention, we propose an additional traffic grooming method—selective grooming—which is applicable in conjunction with any other grooming method. In selective grooming, a low traffic node is coupled (a) directly to an other low traffic node via a high capacity trunk, and (b) to a high traffic node via a high capacity trunk such that only a portion of the client signals destined for the other low traffic node are groomed into the high capacity trunk to the high traffic node. As described below, selective grooming does not result in any additional security risk and does not change the reliability characteristics of the underlying method. However, selective grooming provides an opportunity for reducing the network cost.

An illustrative method for performing selective grooming is performed as follows. The aggregate amount of traffic between two landing sites (e.g., cable stations) is first determined. Then, the determined aggregate amount of traffic is compared to a predetermined threshold, or fraction, K, of a higher capacity signal. If the determined aggregate amount of traffic is greater than K, than another full direct trunk of the higher capacity signal is provisioned between the landing sites. Any additional traffic between the landing sites (beyond the capacity of the newly provisioned direct trunk) is still routed through an intermediate central office.

DETAILED DESCRIPTION

Figure 1:
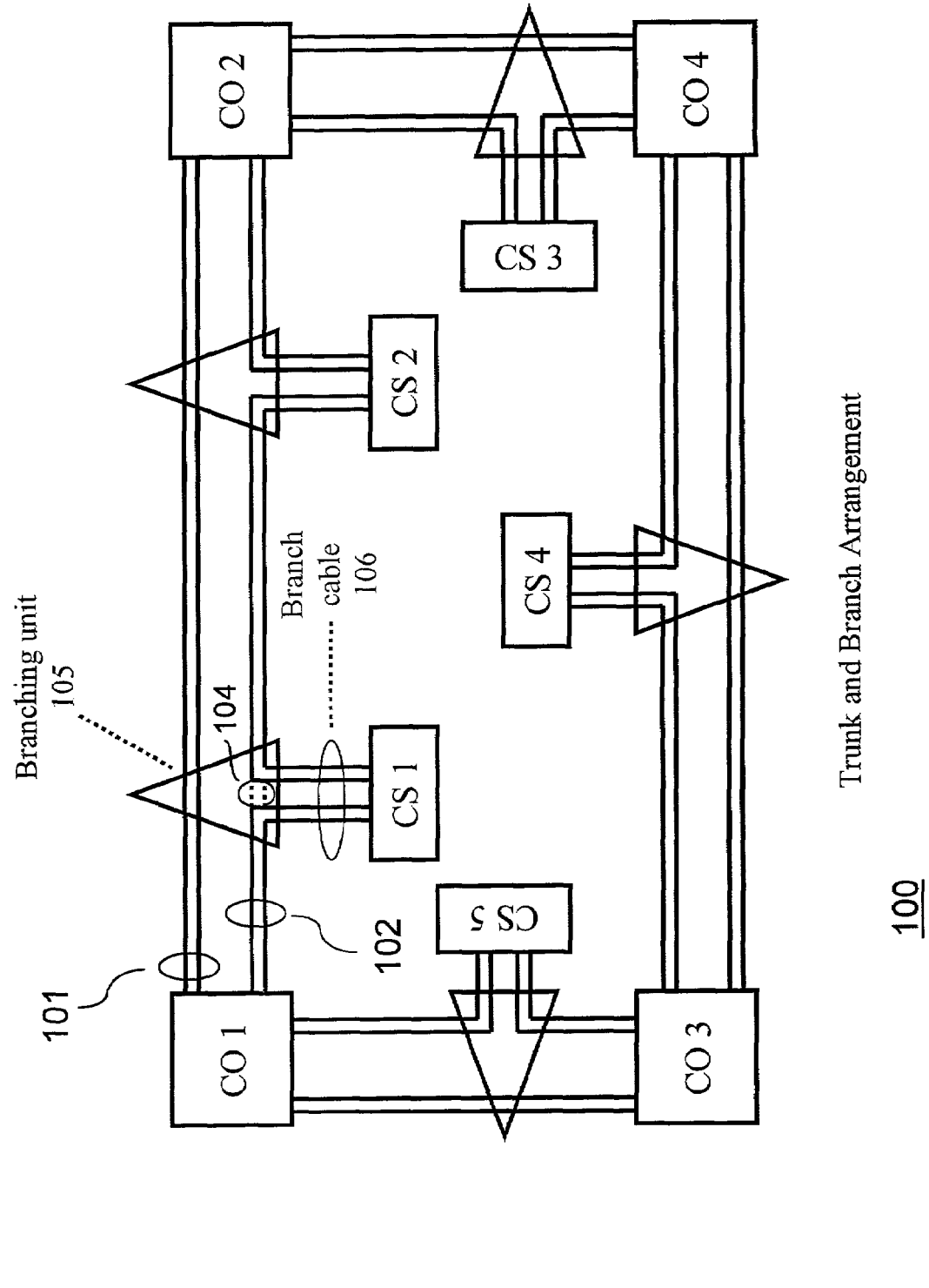
FIG. 1 shows a prior art trunk and branch arrangement.

Before describing the inventive concept, a prior art trunk and branch arrangement for use in an undersea cable system 100 is shown in FIG. 1. The elements of FIG. 1 are well known and are not described herein. The trunk and branch arrangement comprises a number of "major traffic" generating nodes represented by four central offices (COs): CO 1, CO 2, CO 3 and CO 4. These central offices (representative of one type of node) are illustratively coupled together in a synchronous optical network (SONET) synchronous digital hierarchy (SDH) ring via two pairs of fiber: fiber pair 101 and fiber pair 102. These two fiber pairs are the "trunk part" of undersea cable system 100 and, as can be observed from FIG. 1, terminate at the central offices. A low traffic node (representative of a second type of node) is referred to herein as a cable station (CS) and is illustrated in FIG. 1 by CS 1, CS 2, CS 3, CS 4 and CS 5. Each cable station couples to the trunk cable via a respective "branch cable" and a "branching unit." This is illustrated in FIG. 1 via branching unit 105 and branch cable 106, which couple CS 1 to fiber pair, or trunk, 102. A branching unit typically resides in international deep waters. By doing this, a low traffic node can be attached to the undersea cable network without essentially bringing the whole trunk down to shallow waters. It should be noted that a branching unit incorporates a fiber switch, which provides the ability to switch traffic through, i.e., bypass the cable station. This is illustrated in FIG. 1 for branch unit 105, via dotted lines 104. As referred to herein, each cable station transmits, and receives, client traffic to, and from, undersea cable system 100.

Figure 2:
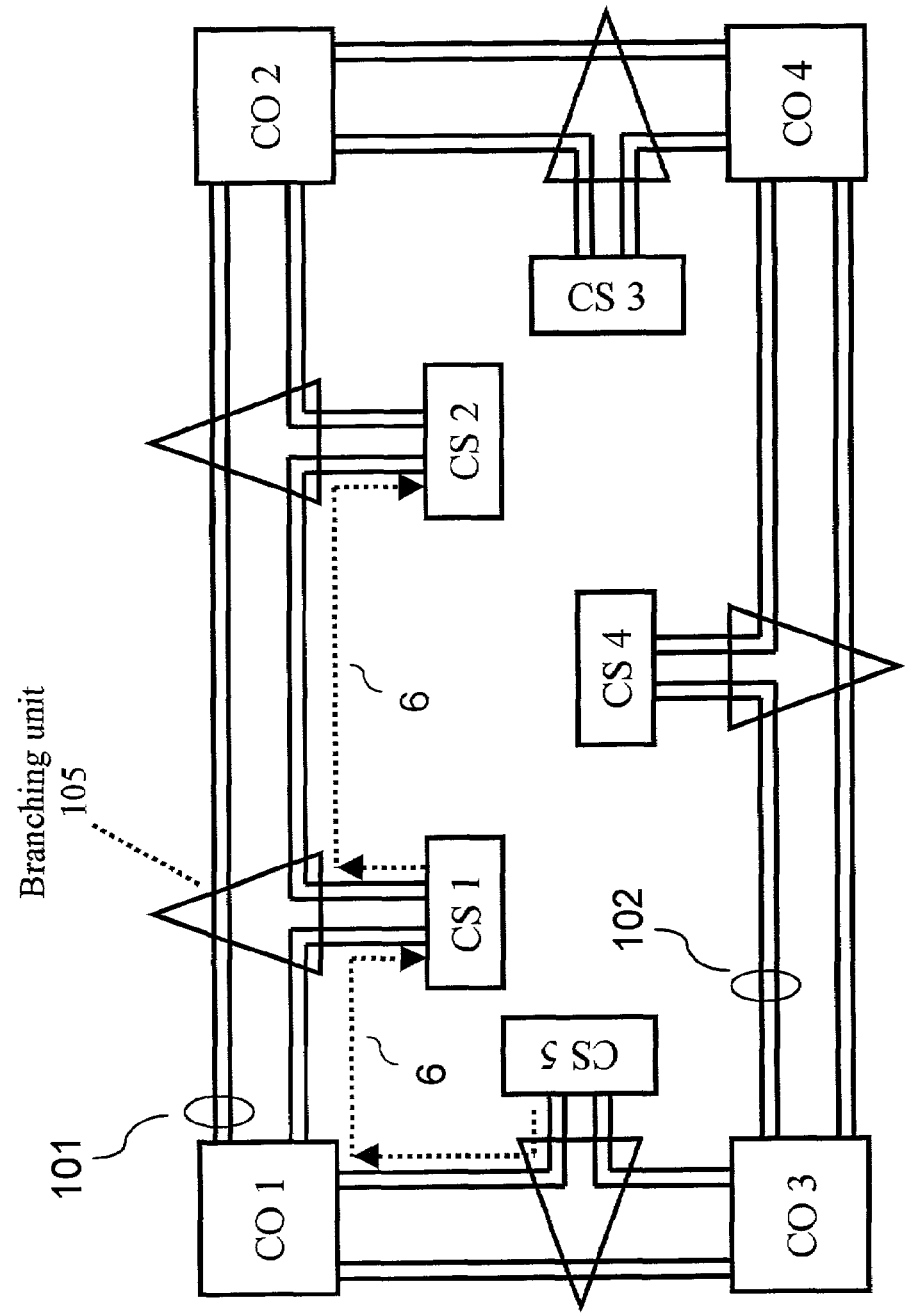
FIG. 2 shows a prior art traffic path under normal conditions.
Figure 3:
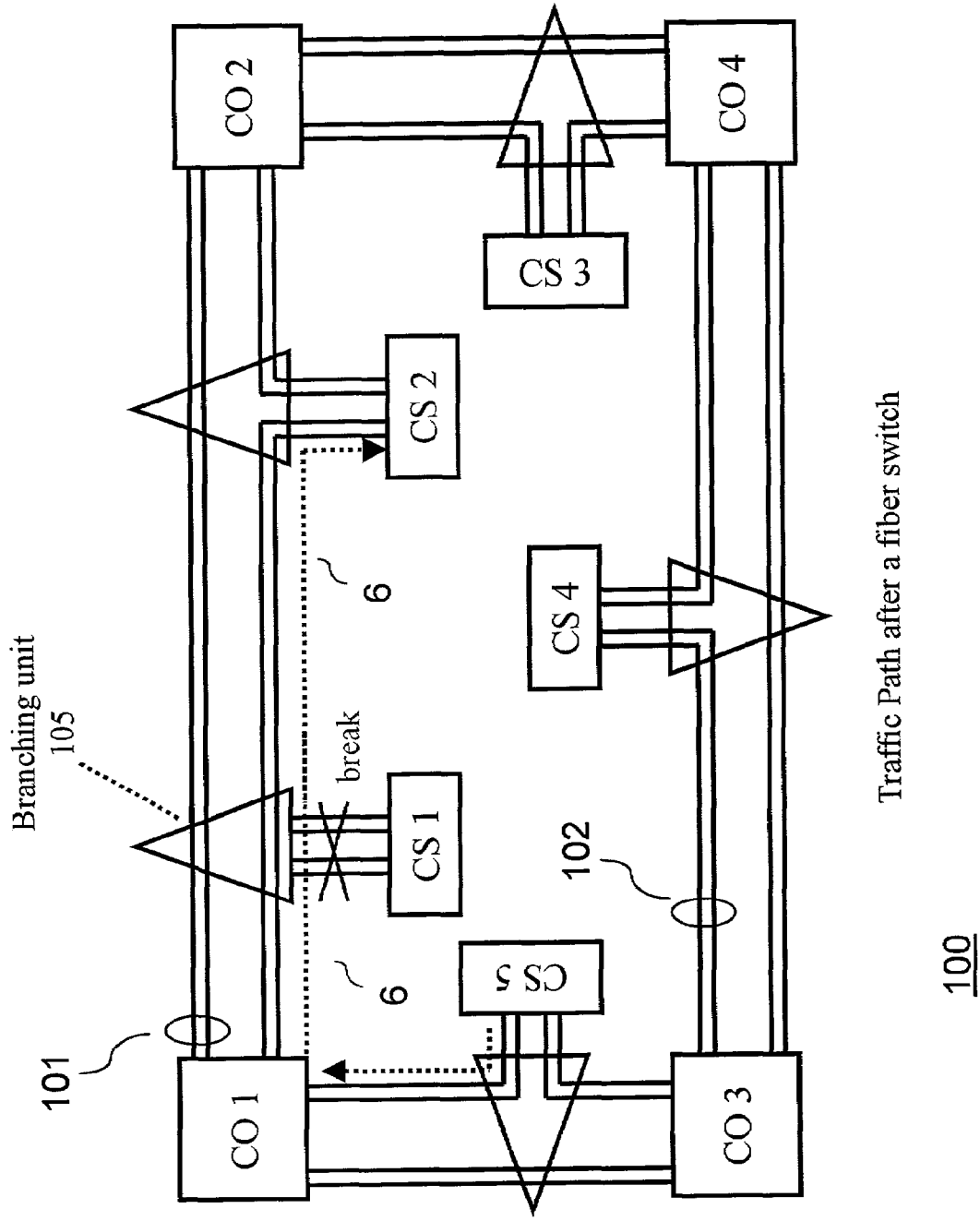
FIG. 3 shows a prior art traffic path after a fiber switch by a branching unit.

The trunk and branch arrangement illustrated in FIG. 1 (where one fiber pair is used to connect cable stations to the trunk cable via a branching unit) enables the undersea cable network to provide additional security and availability to the transit and through traffic. For example, if the traffic between COs is placed on fiber pair number 101 then this traffic is not effected by a branch cable cut. Moreover, since the traffic over fiber pair 101 never physically passes through any cable station, the cable stations do not have any opportunity to tap into this traffic. Further, in the case of a failure on the branch cable side, the branching unit allows the network to isolate the particular branch cable so the rest of the traffic on fiber pair 102 does not see any failure effect. This is illustrated in FIGS. 2 and 3, which together further illustrate the usefulness of a fiber switched capable branching unit. Specifically, FIG. 2 shows the normal path of a wavelength, 6, between CS 5 and CS 2. This wavelength is carried from CS 5 to CS 2 through CS 1 over fiber pair 102. In contrast, FIG. 3 shows the wavelength, 6, after branching unit 105 performs a switch to re-route it after a break in the branch cable to CS 1 has been detected. Thus, a failure in the branch cable to a cable station can be isolated and does not affect the through wavelength carrying traffic between other cable stations.

Figure 4:
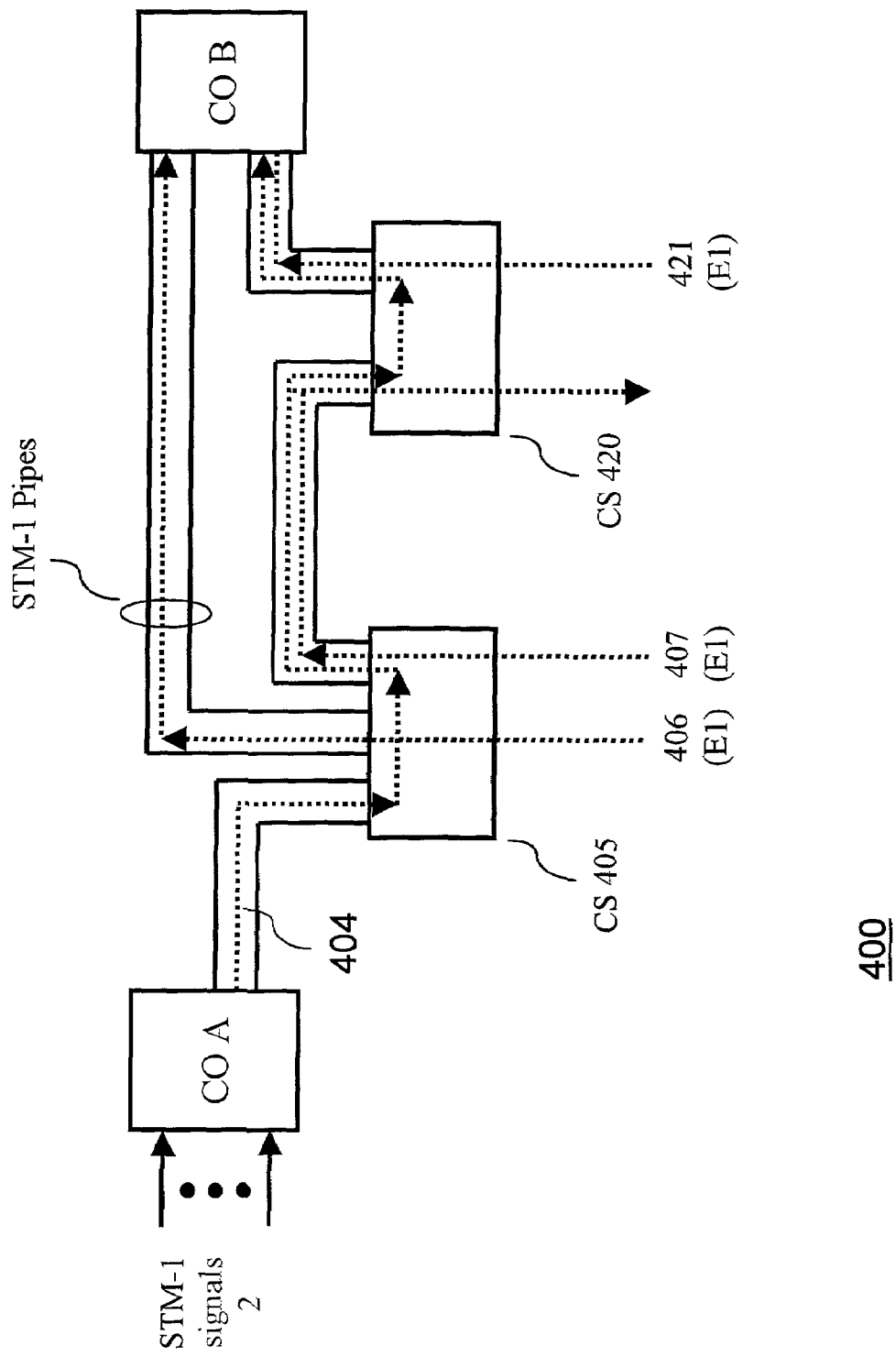
FIG. 4 illustrates a network architecture that performs two levels of grooming.

As noted above, it was assumed that the network transport architecture illustrated in FIG. 1 was representative of SDH rings overlaid on top of a trunk and branch cable layout. Also, as noted earlier, it is known in the art that "traffic grooming," or simply "grooming," can be performed at, e.g., each central office via ring terminals (not shown). (As used herein, grooming refers to the method of rearrangement of lower-speed signals within a higher-speed container signal in order to improve the utilization of the container capacity.) Turning now to FIG. 4, a portion, 400, of an SDH ring is shown in which grooming is performed. CO A and CO B are representative of central offices in portion 400. It is assumed that CO A and CO B have SDH equipment (not shown). Each CO is capable of grooming STM-1 traffic (as represented by STM-1 signals, 2, applied to CO A) into STM-64 traffic for transmission. This is a "first" level of grooming. Unfortunately, if client traffic from the cable stations ranges down to the E1 level, another level of grooming must be performed. However, ring terminals cannot groom at the E1 level. As such, and to further improve capacity utilization, additional equipment must be deployed in a hierarchical arrangement, to support a second level of grooming at the E1 level. This is illustrated in FIG. 4, where each cable station performs E1 grooming. (Since each cable station grooms E1 signals into STM-1 pipes that have spare capacity, the STM-64 signals are not shown for simplicity.) In FIG. 4, traffic, 404, between CO A and CO B is groomed at CS 405 (via the addition of E1 traffic 407) and CS 420 (via the addition of E1 traffic 421). Traffic 404 is transported on separate STM-1 pipes between CO A and CS 405, CS 405 and CS 420, and CS 420 and CO B. Similarly, other traffic, as represented by E1 traffic 406 is groomed by CS 405 onto another STM-1 pipe between CS 405 and CO B.

However, E1 grooming at the cable stations, as represented in FIG. 4, must be carefully considered in terms of its impact on security, network availability and capacity utilization. For example, in the grooming arrangement illustrated in FIG. 4, in the event of a cable cut on the branch connecting CS 405 to the undersea cable network, the SDH network will not be able to restore either STM-1 (which were transporting traffic 404 from CO A to CO B) since there is no alternate physical path available to CS 405. As a consequence, traffic 404 between CO A and CO B is lost. (It should be observed that since traffic 404 passes through STM-1 pipes terminated on a cable station (e.g., the one terminated between CO A and CS 405), any transit E1 traffic being groomed at the effected cable station can not be restored via the ring terminals employing standard SDH ring protection.) This loss of traffic 404 is unfortunate because traffic 404 has nothing to do with CS 405 other than that CS 405 is the selected E1 grooming location. Another implication of performing E1 grooming at a cable station is that such a cable station (e.g., CS 405) has direct access to transit traffic 404 between CO A and CO B. This represents a potential security compromise for traffic 404.

The above discussion directly leads to several alternate methods for traffic grooming as shown in Table One, below. Each option has different implications for security and for reliability in the event of a failure. This in turn reflects on network cost. In method M1, (illustrated in FIG. 4) E1 grooming is carried out at all landing sites (e.g., cable stations) and this has the problem of lost traffic in the event of branch cuts. Also, as noted above, security is compromised at the cable stations. In method M2, E1 grooming is performed only at the COs. As a result, in this method transit traffic is not impacted by branch cuts. There is, however, a security issue at the COs. Typically, access to transit traffic at COs is not considered as big a security risk as having access at a cable station because the COs are usually located at neutral or "friendly" locations but there is some risk. In the final method, M3, no E1 level grooming is performed at all. Clearly, this method provides the best reliability and security. However, it is likely to result in extremely poor capacity utilization (and hence network cost) especially when the traffic levels between two landing sites are low relative to the transport signal rate.

TABLE ONE

Traffic Grooming Methods

| Method | E1 Grooming Location | Reliability | Security |
| --- | --- | --- | --- |
| M1 | CO and CS | No protection for transit traffic due to branch cuts | Unsecure transit traffic at CO and CS |
| M2 | CO only | Transit traffic protected during branch cuts | Unsecure transit traffic at CO only |
| M3 | No grooming | Transit traffic protected during branch cuts | Secure transit traffic at CS and CO |

As noted above, when a network architecture supports grooming, the affects on network security and reliability must be understood. In addition, capacity utilization must be considered. As such, and in accordance with the invention, we also propose an additional traffic grooming method—selective grooming—which is applicable in conjunction with any of the above-described methods. As described below, selective grooming does not result in any additional security risk and does not change the reliability characteristics of the underlying method. However, selective grooming provides an opportunity for reducing the network cost in each of the above-mentioned methods shown in Table One.

Figure 5:
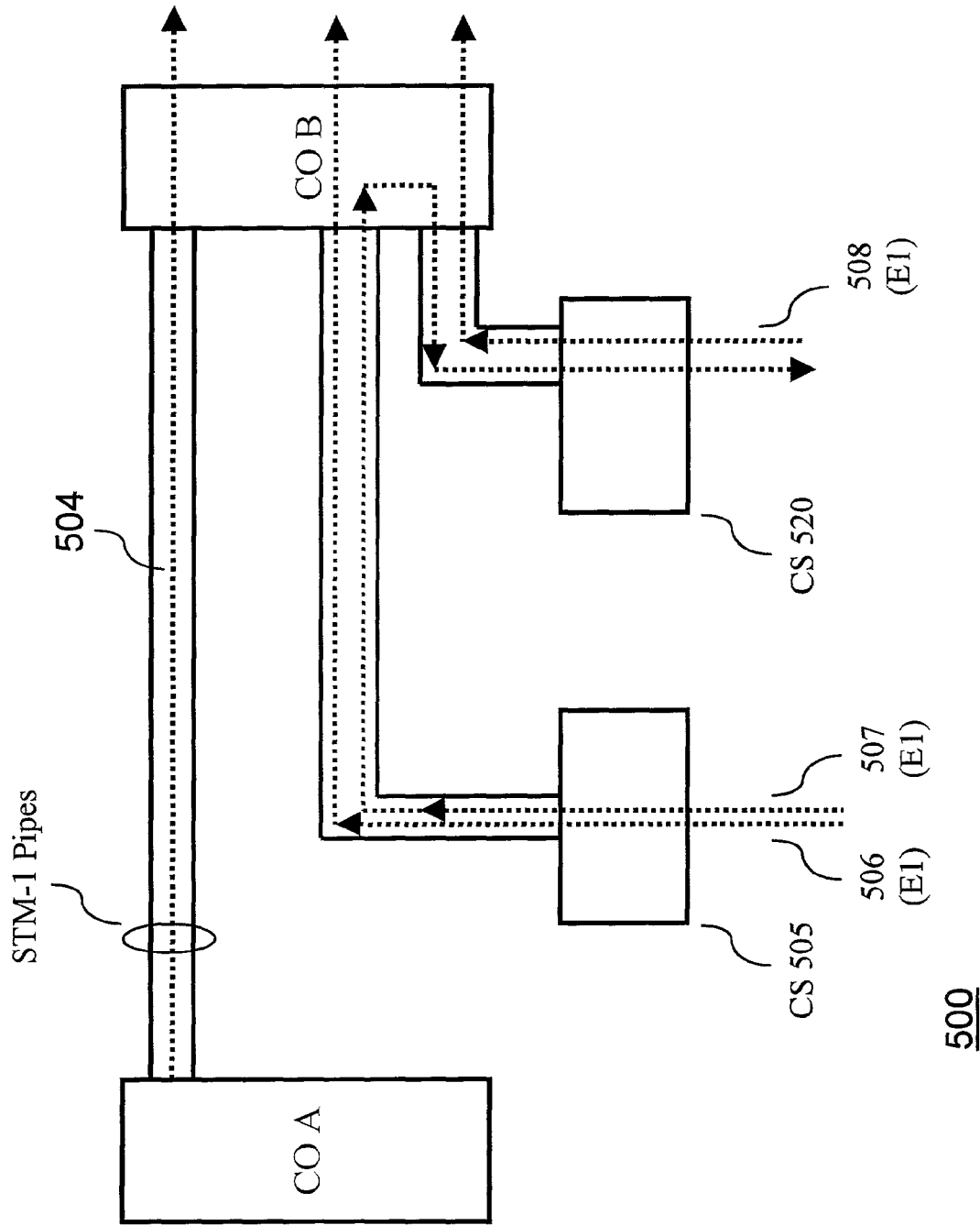
FIG. 5 illustrates back hauling.

For example, one cost that is of concern is "back hauling." This is illustrated in FIG. 5 by portion 500 of an SDH ring. As before, CO A and CO B are representative of central offices in portion 500 and perform grooming of STM-1 traffic. It is assumed that CO A and CO B have SDH equipment (not shown). Also, it is assumed that CO A and CO B are coupled together via a separate STM-1 pipe for transmission of traffic 504. Also, each cable station grooms E1 traffic. For example, CS 505 grooms E1 signals into traffic 506 and traffic 507 for transport to CO B. As can be observed from FIG. 5, there is a separate STM-1 pipe coupling CS 505 with CO B. Similarly, there is a separate STM-1 pipe coupling CS 520 with CO B. In such an arrangement, where separate pipes couple cable stations directly to central offices, "back hauling" may occur. In particular, referring to FIG. 5, it can be observed that some E1 signals are groomed as traffic 507 for transport to CO B and then from CO B "back" to CS 520. In other words, in this example, traffic between cable stations (here, represented by CS 505 and CS 520) must utilize the pipe to the central office (here, represented by CO B) and then use another pipe back from the central office.

Unfortunately, to some extent this is costly, since this traffic can be viewed as, to some extent, re-tracing a portion of the transmission path. Therefore, and in accordance with the invention, selective grooming is used.

In selective grooming, if traffic from one cable station to another reaches a certain level, then a separate transmission facility (e.g., a separate STM-1 pipe) is provisioned between the cable stations—this will alleviate some of the costs (and not require the provisioning of additional STM-1 pipes to be utilized in the SDH ring when traffic to an adjacent cable station increases).

Figure 6:
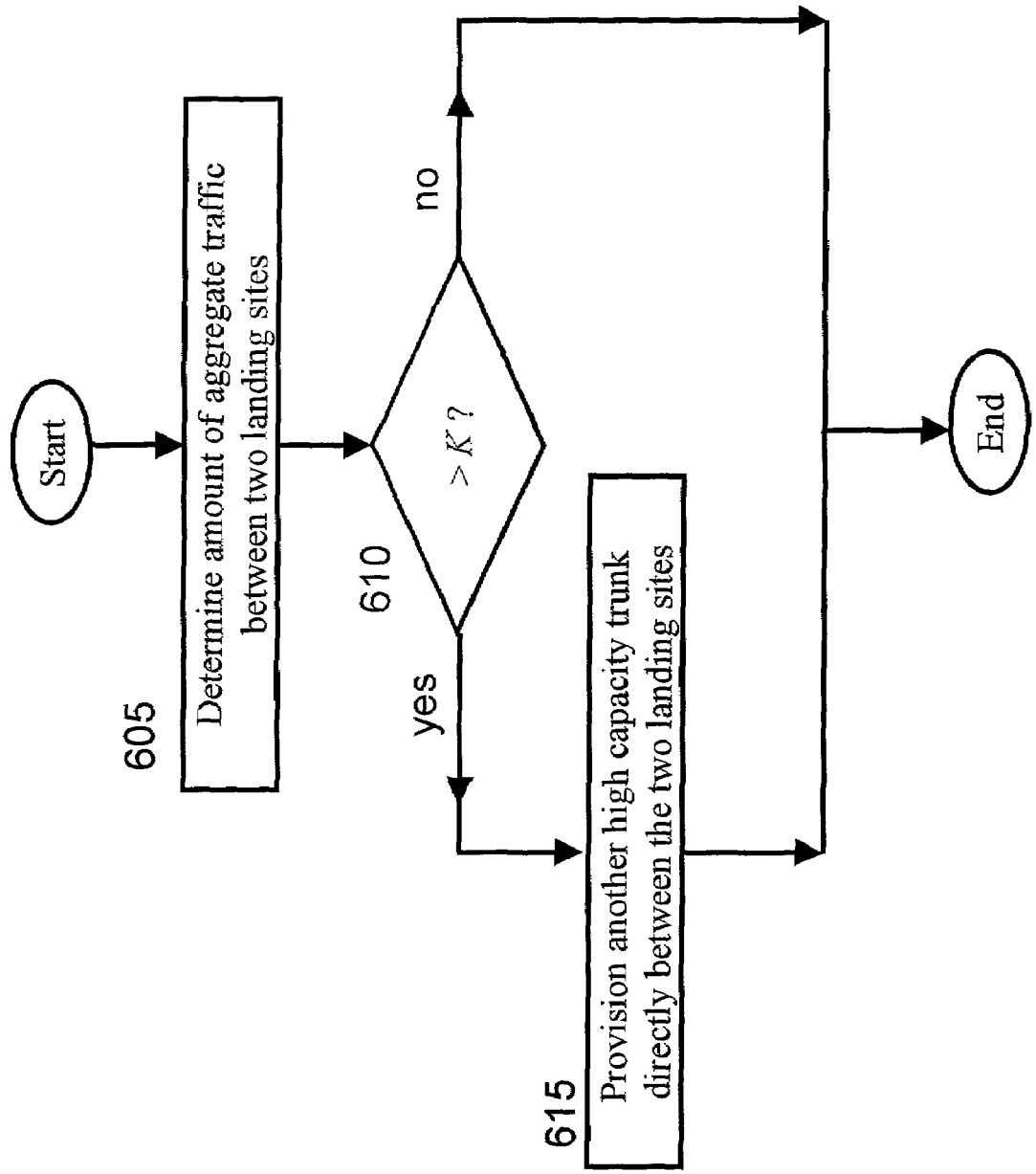
FIG. 6 illustrates a selective grooming method in accordance with the principles of the invention.
Figure 7:
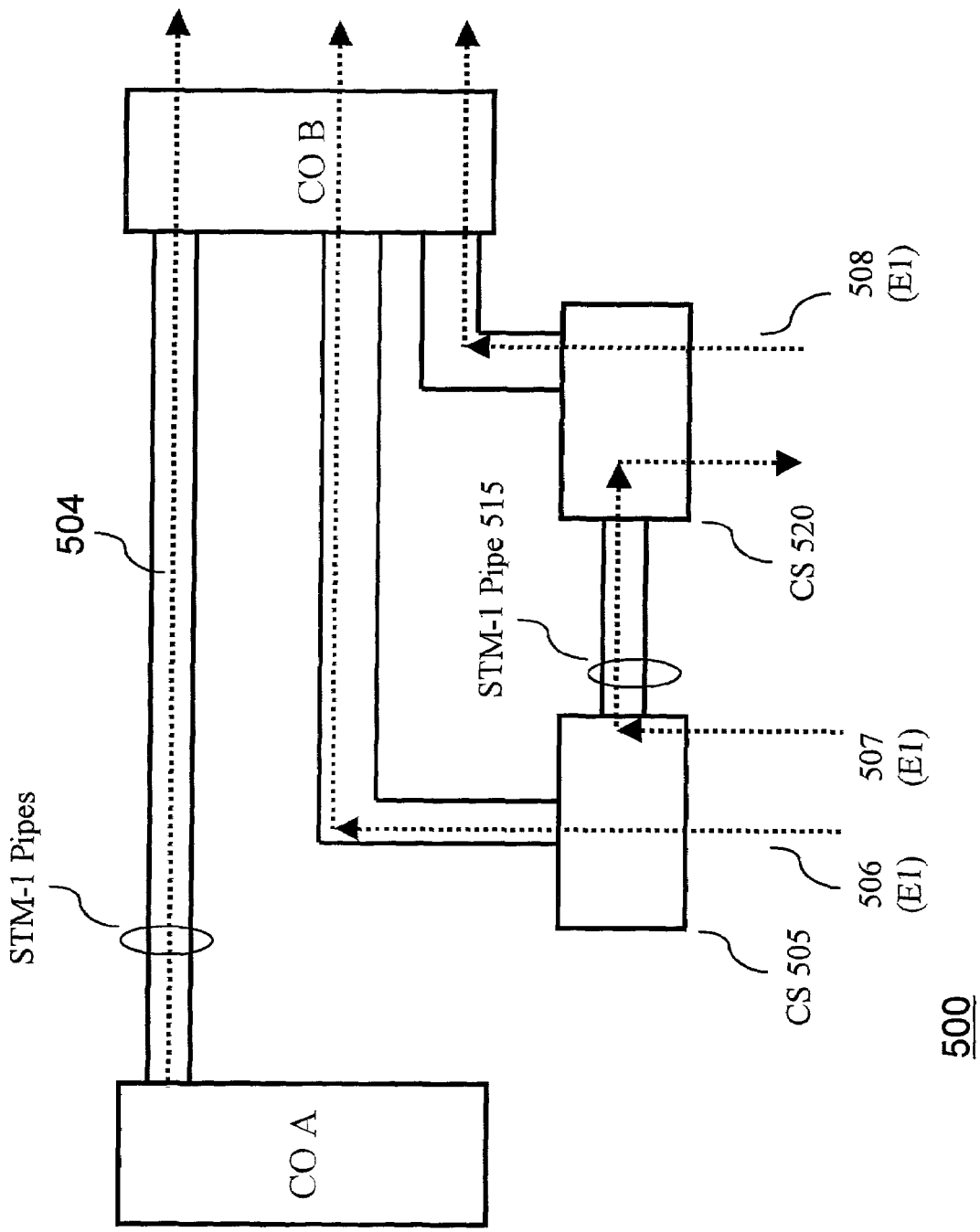
FIG. 7 illustrates a network architecture that results from performing selective grooming in accordance with the principles of the invention.

An illustrative method for performing selective grooming is shown in FIG. 6. In step 605, the aggregate amount of traffic between two landing sites (e.g., cable stations) is determined. In step 610, the determined aggregate amount of traffic is compared to a predetermined threshold, or fraction, K, of a higher capacity signal. For example, assume that the higher capacity signal is an STM-1 signal. There are 63 E1 signals in an STM-1 signal. An illustrative predetermined threshold is 30 E1 signals (47.6% of an STM-1 signal). If the determined aggregate amount of traffic is greater than K, than another full direct trunk of STM-1 capacity is provisioned between the landing sites in step 615. By appropriate choice of threshold, it is possible in most cases to improve the overall cost of the network with this additional traffic grooming method. An illustrative network architecture resulting from the application of selective grooming is shown in FIG. 7. The latter is similar to FIG. 5 except that selective grooming of E1 traffic 507 has been performed. Since, the determined aggregate amount of E1 traffic exceeded the threshold, e.g., 30, a separate higher capacity pipe, as represented by STM-1 pipe 515 was provisioned between CS 505 and CS 520. As such, the amount of traffic being "back hauled" is reduced, or eliminated, since a portion, if not all, of E1 traffic 507 is now routed directly between CS 505 and CS 520. In other words, in selective grooming, a low traffic node (e.g., CS 505) is coupled (a) directly to an other low traffic node (e.g., CS 520) via a high capacity trunk, and (b) to a high traffic node (e.g., CO B) via a high capacity trunk such that only a portion (if any) of the client signals destined for the other low traffic node are groomed into the high capacity trunk to the high traffic node. It should also be noted that in the case of a cable cut on the branch connecting CS 505 to CO B, any other network traffic other than the traffic originated by, or destined to, CS 505 will not be lost.

Figure 8:
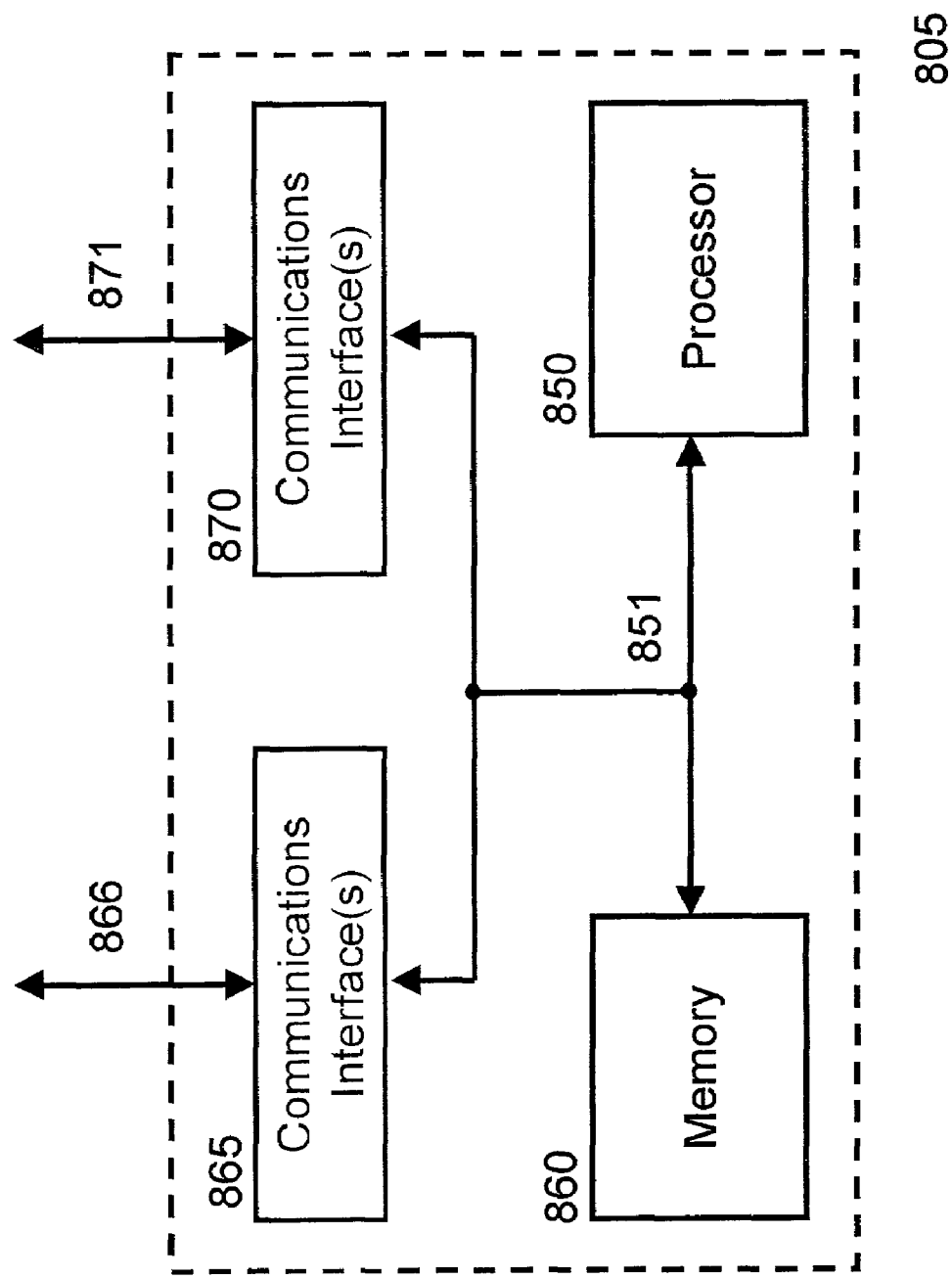
FIG. 8 shows an illustrative high-level block diagram of a node for use in accordance with the principles of the invention.

Turning briefly to FIG. 8, a high-level block diagram of a representative node (e.g., CS 505) for use in accordance with the principles of the invention is shown. Node 805 is a stored-program-control based processor architecture and includes processor 850, memory 860 (for storing program instructions and data, e.g., for communicating in accordance with the above-described selective grooming procedure) and communications interface(s) 865 and 870 for coupling to (a) a high capacity trunk 866 to, e.g., CO B of FIG. 7, and (b) a high capacity trunk 871 to, e.g., CS 520 of FIG. 7, respectively. All elements of node 805 communicate via bus structure 851.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although described in the context to two levels of traffic grooming, the inventive concept is also applicable to network architectures that provide additional levels of grooming. Similarly, although described in the context of an undersea cable system, the inventive concept is applicable to other forms of network architectures, whether land-based, wireless, or combinations thereof. Also, the inventive concept applies to other arrangements such as mesh-type transport and other signal levels. Further, although the cable stations were illustrated in the context of low traffic nodes, these could just as easily represent high traffic nodes. In addition, although traffic was used to illustrate the different types of nodes, e.g., a central office is a first type of node and a cable station is a second type of node, the definition of types of nodes is not so limited and other features may also be used to distinguish one type of node from another, such as, e.g., political considerations, etc.

What is claimed:

1. A first type one node for grooming low capacity client signals into a high capacity signal, comprising:
   a first interface to a first high capacity trunk for directly coupling to a second type one node; and
   a second interface to a second high capacity trunk for directly coupling to a type two node;
   wherein only a portion of those low capacity client signals destined for the second type one node are groomed into the second high capacity trunk to the type two node.

2. The apparatus of claim 1, wherein the type two node is a high traffic node.

3. The apparatus of claim 1, wherein the second type one node is an enhanced cable station and the type two node is a central office.

4. The apparatus of claim 1, wherein the low capacity client signals comprise plesiochronous digital hierarchy signals and the high capacity signal comprises a synchronous transport module signal.

5. The apparatus of claim 1, wherein grooming of the portion of those low capacity client signals destined for said second type one node into the second high capacity trunk to said type two node further comprises:
   determining an aggregate amount of traffic between said first type one node and said second type one node;
   determining whether said aggregate amount of traffic between said first type one node and said second type one node exceeds a predetermined threshold, said predetermined threshold comprising a fraction of a capacity of said first high capacity trunk directly coupling said first type one node and said second type one node; and
   if said aggregate amount of traffic between said first type one node and said second type one node does not exceed said predetermined threshold, routing said amount of traffic from said first type one node over said second, high capacity trunk to said second type two node; or
   if said amount of traffic between said first type one node and said second type one node exceeds said predetermined threshold, provisioning at least one additional high capacity trunk between said first type one node and said second type one node.

6. An apparatus for performing selective grooming of client signals, the apparatus comprising:

a first type one node coupled (a) directly to a second type one node via a first interface to a first high capacity trunk, and (b) directly to a type two node via a second interface to a second high capacity trunk, such that only a portion of the client signals destined for the second type one node are groomed into the second high capacity trunk to the type two node.

7. The apparatus of claim 6, wherein the second type one node is a low traffic node and the type two node is a high traffic node.

8. The apparatus of claim 6, wherein the second type one node is an enhanced cable station and the type two node is a central office.

9. The apparatus of claim 6, wherein the client signals comprise plesiochronous digital hierarchy signals and the first high capacity trunk and the second high capacity trunk each support a synchronous transport module signal.

10. A method for use in a first type one node, the method comprising the steps of:

receiving low capacity client signals;

selectively grooming a portion of the received low capacity client signals into a first high capacity trunk directly coupled to a second type one node for transmission to the second type one node; and transmitting others of the low capacity client signals over a second high capacity trunk directly coupled to a type two node;

wherein said others of the low capacity signals transmitted over the second high capacity trunk comprise low capacity client signals destined for the second type one node.

11. The method of claim 10, wherein the low capacity client signals comprise plesiochronous digital hierarchy signals, and the first high capacity trunk and the second high capacity trunk each support a synchronous transport module signal.

12. The method of claim 10, wherein the second type one node is an enhanced cable station and the type two node is a central office.

13. The method of claim 10, wherein the second type one node is a low traffic node and the type two node is a high traffic node.

* * * * *